(12) United States Patent
Schulte et al.

(10) Patent No.: US 11,742,782 B2
(45) Date of Patent: Aug. 29, 2023

(54) METHOD FOR OPERATING A SYNCHRONOUS MOTOR EXCITED BY PERMANENT MAGNETS, ELECTRONIC CONTROL DEVICE, MOTOR ARRANGEMENT, AND STORAGE MEDIUM

(71) Applicant: Continental Teves AG & Co. OHG, Frankfurt am Main (DE)

(72) Inventors: Dominik Schulte, Mühltal (DE); Bogdan Budianu, Oberursel (DE); Eugen Bartel, Wetzlar (DE); Tom Kaufmann, Ippenschied (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 17/661,632

(22) Filed: May 2, 2022

(65) Prior Publication Data
US 2022/0263444 A1 Aug. 18, 2022

Related U.S. Application Data

(63) Continuation of application No. 17/177,746, filed on Feb. 17, 2021, now Pat. No. 11,362,610, which is a
(Continued)

(30) Foreign Application Priority Data
Aug. 17, 2018 (DE) .................... 10 2018 213 939.3

(51) Int. Cl.
*H02P 21/13* (2006.01)
*H02P 21/22* (2016.01)
*H02P 27/12* (2006.01)
*B60R 16/03* (2006.01)

(52) U.S. Cl.
CPC .............. *H02P 21/22* (2016.02); *H02P 27/12* (2013.01); *B60R 16/03* (2013.01); *H02P 2207/05* (2013.01)

(58) Field of Classification Search
CPC ...... H02P 21/22; H02P 27/12; H02P 2207/05; H02P 21/13; B60R 16/03
See application file for complete search history.

(56) References Cited

U.S. PATENT DOCUMENTS 6,239,575 B1 * 5/2001 Xu .................. B60L 15/025
318/599
2004/0008004 A1 1/2004 Papiernik et al.
(Continued)

FOREIGN PATENT DOCUMENTS

CN 106451532 A 2/2017
DE 102013207727 A1 10/2014
(Continued)

OTHER PUBLICATIONS

German Search Report dated May 15, 2019 for the counterpart German Application No. 10 2018 213 939.3.
(Continued)

*Primary Examiner* — Cortez M Cook

(57) ABSTRACT

A method for operating a permanent magnet synchronous motor comprises setting a maximum power, determining a current vector and an output voltage vector in the dq coordinate system. A setpoint amount for a setpoint voltage vector is calculated on the basis of the maximum power, the current vector and the output voltage vector. The setpoint voltage vector is generated with the setpoint amount, and then operating the permanent magnet synchronous motor at least with the setpoint voltage vector.

11 Claims, 2 Drawing Sheets

Related U.S. Application Data continuation of application No. PCT/EP2019/070314, filed on Jul. 29, 2019.

(56) References Cited

U.S. PATENT DOCUMENTS

| | | | |
|---|---|---|---|
| 2010/0187046 A1 | 7/2010 | Stolt et al. | |
| 2011/0133678 A1* | 6/2011 | Tomigashi | H02P 27/08 318/400.04 |
| 2012/0056602 A1 | 3/2012 | Li | |
| 2013/0229135 A1* | 9/2013 | Long | H02P 21/13 318/400.34 |
| 2015/0198930 A1 | 7/2015 | Antraygue | |

FOREIGN PATENT DOCUMENTS

| | | |
|---|---|---|
| DE | 102016206706 A1 | 10/2017 |
| EP | 1317060 A2 | 6/2003 |
| EP | 2195920 A1 | 6/2010 |
| EP | 2632038 A1 | 8/2013 |
| EP | 3104520 A1 | 12/2016 |
| JP | 2007215365 A | 8/2007 |
| JP | 2017070066 A | 4/2017 |
| KR | 20010001044 A | 1/2001 |
| WO | 2005069478 A1 | 7/2005 |

OTHER PUBLICATIONS

International Search Report dated Sep. 19, 2019 for the counterpart PCT Application No. PCT/EP2019/070314.
Request for the Submission of an Opinion dated Jan. 30, 2023 for the Counterpart Japanese Patent Application No. 10-2021-7004627.
European Examination Report dated Jan. 20, 2023 for the counterpart European Patent Application No. 19 746 467.0.
Chinese Office Action dated Apr. 8, 2023 for the counterpart Chinese Application No. 20198005011.4.

* cited by examiner

METHOD FOR OPERATING A SYNCHRONOUS MOTOR EXCITED BY PERMANENT MAGNETS, ELECTRONIC CONTROL DEVICE, MOTOR ARRANGEMENT, AND STORAGE MEDIUM

CROSS-REFERENCE TO RELATED APPLICATIONS

This application is a continuation of U.S. application Ser. No. 17/177,746 filed Feb. 17, 2021, which claims priority to PCT Application PCT/EP2019/070314, filed Jul. 29, 2019, which claims priority to German Application DE 10 2018 213 939.3, filed Aug. 17, 2018; the contents of all above-named applications are incorporated herein by reference.

TECHNICAL FIELD

A method for operating a permanent magnet synchronous motor and a control device, and a motor arrangement and a storage medium for carrying out such a method.

BACKGROUND

Permanent magnet synchronous motors can be used in motor vehicles, for example to generate pressure in a brake system. Such a motor is typically supplied via an electrical system of the motor vehicle, in which there are a large number of components which represent a respective power source or power sink. For the stable operation of such a vehicle electrical system, it is typically necessary to achieve a balance between power generation and power consumption. This may make it necessary that the total power consumed is limited in the case of power consumers such as a permanent magnet synchronous motor. Such a power can be calculated, for example by multiplying an operating voltage of the vehicle electrical system by a maximum permissible current. In particular, the maximum permissible current may also change, depending on the operating state of the vehicle electrical system.

This may make it necessary to adapt the operation of a permanent magnet synchronous motor so that it does not consume more than the maximum permissible power. There are already various approaches to this which are known in the prior art. For example, one assumes a measured power and adapts motor parameters so that the maximum permissible power is not exceeded. Another approach uses a pre-defined motor model.

Therefore, an improved method for operating a permanent magnet synchronous motor is desirable.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for operating a permanent magnet synchronous motor comprises setting a maximum power, determining a current vector and an output voltage vector in the dq coordinate system. A setpoint amount for a setpoint voltage vector is calculated on the basis of the maximum power, the current vector and the output voltage vector. The setpoint voltage vector is generated with the setpoint amount, and then operating the permanent magnet synchronous motor at least with the setpoint voltage vector.

The method described herein is based on simple relationships which the inventors of the present application have recognized and which can be used in a simple manner for limiting the power of a permanent magnet synchronous motor. It is possible here to dispense with an indirect approach of measuring the power, in the same way as it is possible to dispense with the implementation of complex motor models. In particular, in the case of the method, the setpoint voltage vector is generated with a setpoint amount which ensures compliance with a maximum power.

The dq coordinate system is generally known in the field of controlling permanent magnet synchronous motors and offers a representation of the operating parameters of such a motor.

The maximum power may be set as the product of a specified voltage and a specified maximum current intensity. The specified voltage may in this case correspond for example to an operating voltage of an electrical system, for example an electrical system of a motor vehicle. The operating voltage is for example the voltage to maintain in normal operation. The specified maximum current intensity may according to one embodiment be set, but may according to an alternative embodiment also be calculated variably. This may take place for example depending on various operating states, such as for example the availability of power generators, or the operating state of other power consumers.

According to one embodiment, the current vector is determined on the basis of a torque requirement or on the basis of a power limitation and a torque requirement. The torque requirement may be a specification of the torque the motor should generate at a specific point in time. A current vector in the dq coordinate system can be calculated from this, whereby a power limitation can also be taken into account if necessary.

According to one embodiment, the current vector is determined on the basis of measured currents flowing through the permanent magnet synchronous motor. This represents a further possibility for obtaining the current vector, it being possible to calculate back from such currents to the current vector in the dq coordinate system.

It should be understood that the two possibilities presented for determining the current vector may also be combined, while for example a mutual plausibility check can be used, or else one or the other possibility may be used, depending on the operating state.

According to an embodiment, the output voltage vector in the dq coordinate system is determined on the basis of a torque requirement, or on the basis of a power limitation and a torque requirement, and/or on the basis of the current vector. These are commonly used possibilities for obtaining the output voltage vector, which represents for example a voltage vector that would be at least largely independent of a specified maximum power or power limitation. In other words, the output voltage vector represents the voltage vector that would be used if the motor were allowed to consume any power.

Preferably, an angle of the setpoint voltage vector is set equal to the angle of the output voltage vector. This is in each case the angle in the dq coordinate system. In other words, the setpoint voltage vector is set parallel to the output voltage vector. This makes allowance for the fact that the angle of the output voltage vector may also be retained if the amount of the output voltage vector is to be reduced due to a line limitation that was not yet taken into account when calculating the output voltage vector.

According to a embodiment, the setpoint amount is calculated as the product of the factor ⅔ with a quotient comprising a dividend and a divisor. The dividend is in this case a product of the maximum power and the amount of the output voltage vector. The divisor may be a sum of the product of the d components of the output voltage vector and the current vector on the one hand and the product of the q components of the output voltage vector and the current vector on the other hand. The formula contained therein is derived further below in this application. It should be understood that the mathematical rule "multiplication and division before addition and subtraction" must be observed in the calculations given herein.

An electronic control module which is configured to carry out the method described herein. It is possible here to revert to all of the embodiments and variants described herein.

A motor arrangement has a permanent magnet synchronous motor. The motor arrangement has an inverter for controlling the permanent magnet synchronous motor. Furthermore, the motor arrangement has an electronic control device operating according to the method herein. It is possible here to revert to all of the embodiments and variants described herein.

Also a non-volatile computer-readable storage medium which contains program code for carrying out the method. It is possible here to revert to all of the embodiments and variants described herein.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Further features and advantages will be taken by a person skilled in the art from the exemplary embodiment described below with reference to the appended drawing, in which.

DETAILED DESCRIPTION

Figure 1:
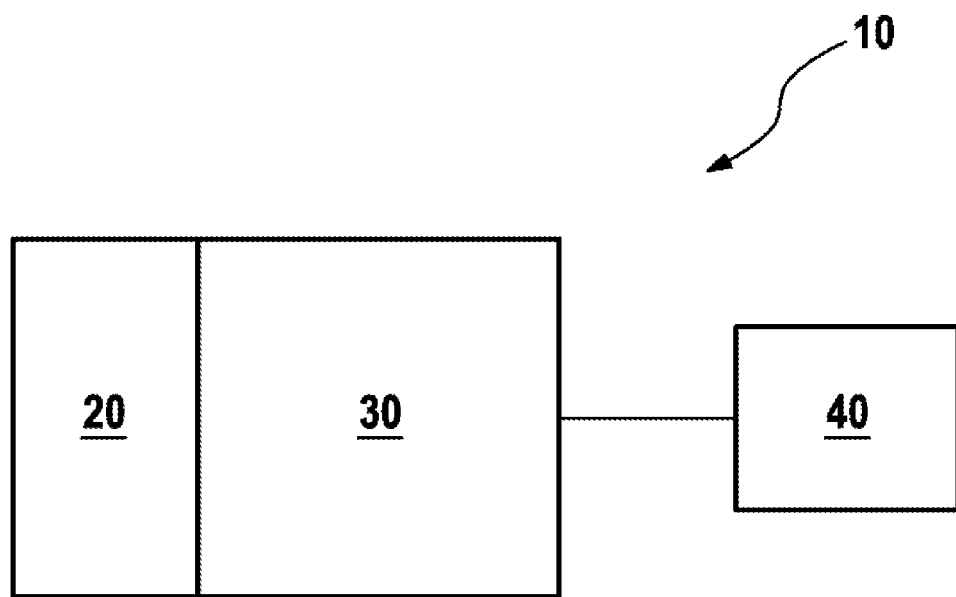
FIG. 1: shows a motor arrangement.

FIG. 1 shows a motor arrangement 10 according to an exemplary embodiment. The motor arrangement 10 has a control device 20, an inverter 30 and a permanent magnet synchronous motor 40. The control device 20 is designed to control the inverter 30, which in turn controls the motor 40, and thus both supplies it with power and specifies its operation, including a torque.

The control device 20 is configured to carry out a method based on the following considerations.

The power consumption of a permanent magnet synchronous motor may be calculated as follows:

$$U_{DC}I_{DC} = 3/2(U_d I_d + U_q I_q)$$

where
$U_{DC}$: is an applied voltage, which may be a specified vehicle electrical system voltage,
$I_{DC}$: is a specified maximum current,
$U_d$: is a d component of a voltage vector actually used in the dq coordinate system,
$I_d$: is a d component of a current vector actually used in the dq coordinate system,
$U_q$: is a q component of the voltage vector actually used in the dq coordinate system, and
$I_q$: is a q component of the current vector actually used in the dq coordinate system.

This formula can be transformed if the amounts of the vectors and the intermediate angle are considered instead of the d and q components:

$$U_{DC}I_{DC} = 3/2 |U_{dq}||I_{dq}| \cos(phi)$$

where
$U_{dq}$: is the voltage vector actually used,
$I_{dq}$: is the current vector actually used, and
phi: is the intermediate angle between $U_{dq}$ and $I_{dq}$.

This equation can be solved for the voltage:

$$|U_{dq}| = \frac{2}{3} \frac{U_{DC}I_{DC}}{|I_{dq}|\cos(phi)}$$

This gives a relationship between a specified maximum power, which is indicated by the product of $U_{DC}$ and $I_{DC}$, the amount of the current vector, the angle phi and the amount of a voltage vector. How this relationship can be used in a motor control is discussed below.

In a control of a permanent magnet synchronous motor, it is possible for example to use a current control or to use a model-based calculation in advance in order to set motor currents by setting dq voltages. Consequently, a current vector may for example be based on measurements or else on a default value. An output voltage vector $U^*_{dq}$, which represents the voltage vector that would be desirable without taking a power limitation into account, may first be calculated. For example, such an output voltage vector $U^*_{dq}$ is based on a torque requirement.

The intermediate angle phi may in this case be calculated as follows:

$$\cos(phi) = \frac{U^*_d I_d + U^*_q I_q}{|I_{dq}||U^*_{dq}|}$$

where
$U^*_d$: is a d component of the output voltage vector and
$U^*_q$: is a q component of the output voltage vector.

If this formula for the cosine of the intermediate angle phi is used in the aforementioned equation for calculating the setpoint amount of the voltage vector, the following formula is obtained:

$$|U_{dq}| = \frac{2}{3} \frac{U_{DC}I_{DC}|U^*_{dq}|}{U^*_d I_d + U^*_q I_q}$$

This allows the calculation of an amount of a voltage vector that is based on a calculated or measured current vector $I_{dq}$ and a calculated output voltage vector $U^*_{dq}$ and at the same time takes into account the power limitation already specified above. This setpoint amount $|U_{dq}|$ can be used if the angle phi calculated according to the above formula is left the same. This results in minimal intervention in the motor parameters, which are only changed to the extent that this is necessary in order to meet the specified maximum power.

Returning to the exemplary embodiment shown in FIG. 1, the control device 20 thus calculates not only the intermediate angle phi but also the output voltage vector $U^*_{dq}$ and the setpoint amount of a voltage vector as just indicated, while it is possible here to revert to either a calculated or a measured current vector $I_{dq}$. The output voltage vector $U^*_{dq}$ is then left constant in terms of its angle, but the amount may be changed to such an extent that its amount corresponds to the setpoint amount $|U_{dq}|$. In this way, the inverter 30, and ultimately also the motor 40, are then controlled. Compliance with a line limitation is thus ensured, although a externally specified torque requirement is met as far as possible with regard to the power limitation.

Figure 2:
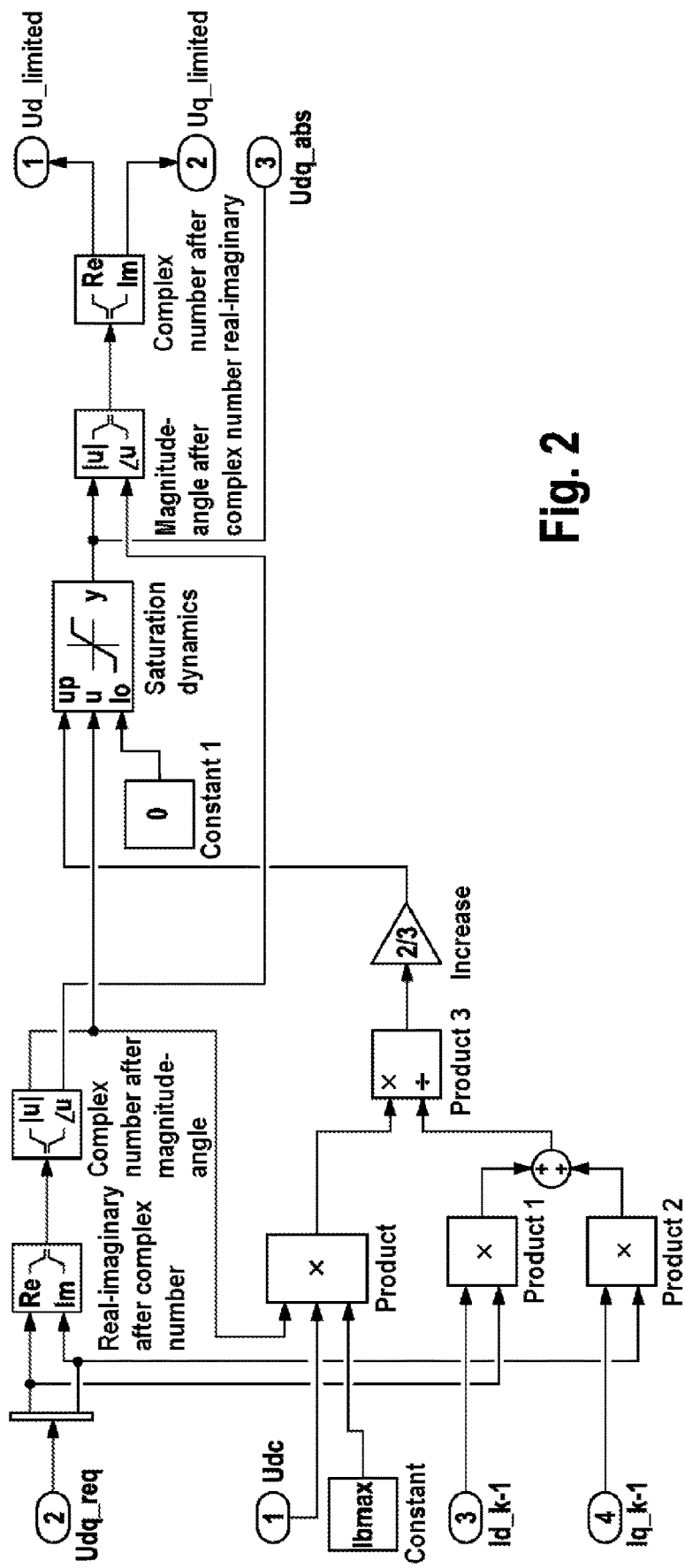
FIG. 2: shows a flow diagram.

FIG. 2 shows the procedure for calculating the setpoint voltage vector or its amount in a schematic overview. In particular, an output voltage vector $U_{dq}\_rec$ is included at the top left. In addition, the current vector $I_{dq}$ with its d and q coordinates is included at the bottom left. In between it can be seen that the maximum power is included in the form of a voltage $U_{DC}$ and a maximum current $I_{bmax}$. It can be seen on the right in the illustration of FIG. 2 that the limited values of the voltage vector are output.

The mentioned steps of the method may be carried out in the order indicated. However, they may also be carried out in a different order, if this is technically appropriate. In one of its embodiments, for example with a specific combination of steps, the method may be carried out in such a way that no further steps are carried out. However, in principle, further steps can also be carried out, even steps that have not been mentioned.

It should also be pointed out that refinements, features and variants of the invention which are described in the various embodiments or exemplary embodiments and/or shown in the figures can be combined with one another in any desired manner. Single or multiple features are interchangeable with one another in any desired manner. Combinations of features arising therefrom are intended to be understood as also covered by the disclosure of this application.

Back-references in dependent claims are not intended to be understood as a relinquishment of the attainment of independent substantive protection for the features of the back-referenced dependent claims. These features may also be combined with other features in any desired manner.

Features which are only disclosed in the description or features which are only disclosed in the description or in a claim in conjunction with other features may in principle be of independent significance essential to the invention. They may therefore also be individually included in claims for the purpose of delimitation from the prior art.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for operating a permanent magnet synchronous motor, the method comprising the following steps:

setting a maximum power;
determining a current vector in the dq coordinate system on the basis of one of a torque requirement and a power limitation and a torque requirement;
determining an output voltage vector in the dq coordinate system;
calculating a setpoint amount for a setpoint voltage vector on the basis of the maximum power, the current vector and the output voltage vector;
generating the setpoint voltage vector with the setpoint amount;
operating the permanent magnet synchronous motor at least with the setpoint voltage vector;
calculating the setpoint amount as the product of the factor ⅔ with a quotient comprising a dividend and a divisor;
calculating the dividend as the product of the maximum power and the amount of the output voltage vector; and
calculating the divisor as the sum of the product of the d components of the output voltage vector and the current vector on the one hand and the product of the q components of the output voltage vector and the current vector on the other hand.

2. The method as claimed in claim 1, further comprising determining the current vector on the basis of measured currents flowing through the permanent magnet synchronous motor.

3. The method as claimed in claim 1, wherein determining the output voltage vector comprises determining the output voltage vector in the dq coordinate system on the basis of one of: a torque requirement, a power limitation and a torque requirement, and the current vector.

4. The method as claimed in claim 1, wherein determining the current vector comprises setting an angle of the setpoint voltage vector equal to the angle of the output voltage vector.

5. An electronic control device with instructions comprising:

setting a maximum power;
determining a current vector in the dq coordinate system on the basis of one of a torque requirement and a power limitation and a torque requirement;
determining an output voltage vector in the dq coordinate system;
calculating a setpoint amount for a setpoint voltage vector on the basis of the maximum power, the current vector and the output voltage vector;
generating the setpoint voltage vector with the setpoint amount;
operating the permanent magnet synchronous motor at least with the setpoint voltage vector;
calculating the setpoint amount as the product of the factor ⅔ with a quotient comprising a dividend and a divisor;
calculating the dividend as the product of the maximum power and the amount of the output voltage vector; and
calculating the divisor as the sum of the product of the d components of the output voltage vector and the current vector and the product of the q components of the output voltage vector and the current vector.

6. The device as claimed in claim 5, wherein determining the current vector comprises determining the current vector on the basis of measured currents flowing through the permanent magnet synchronous motor.

7. The device as claimed in claim 5, wherein determining the output voltage vector further comprises determining the output voltage vector in the dq coordinate system on the basis of one of: a torque requirement, a power limitation and a torque requirement, and the current vector.

8. A motor arrangement comprising:
a permanent magnet synchronous motor,
an inverter for controlling the permanent magnet synchronous motor; and
an electronic control device for controlling the inverter by setting a maximum power;
    determining a current vector in the dq coordinate system on the basis of one of a torque requirement and a power limitation and a torque requirement;
    determining an output voltage vector in the dq coordinate system;
    calculating a setpoint amount for a setpoint voltage vector on the basis of the maximum power, the current vector and the output voltage vector;
    generating the setpoint voltage vector with the setpoint amount;
    operating the permanent magnet synchronous motor at least with the setpoint voltage vector;
    calculating the setpoint amount as the product of the factor ⅔ with a quotient comprising a dividend and a divisor;
    calculating the dividend as the product of the maximum power and the amount of the output voltage vector; and
    calculating the divisor as the sum of the product of the d components of the output voltage vector and the current vector and the product of the q components of the output voltage vector and the current vector.

9. The motor arrangement as claimed in claim 8, wherein determining the current vector comprises determining the current vector on the basis of measured currents flowing through the permanent magnet synchronous motor.

10. The motor arrangement as claimed in claim 8, wherein determining the output voltage vector comprises determining the output voltage vector in the dq coordinate system on the basis of one of: a torque requirement, a power limitation and a torque requirement, and the current vector.

11. The motor arrangement as claimed in claim 8, further comprising setting an angle of the setpoint voltage vector equal to the angle of the output voltage vector.

* * * * *